Jan. 4, 1927.  
C. P. ASTROM  
1,613,153  
DUMPING CAR  
Filed July 7, 1925  
4 Sheets-Sheet 1
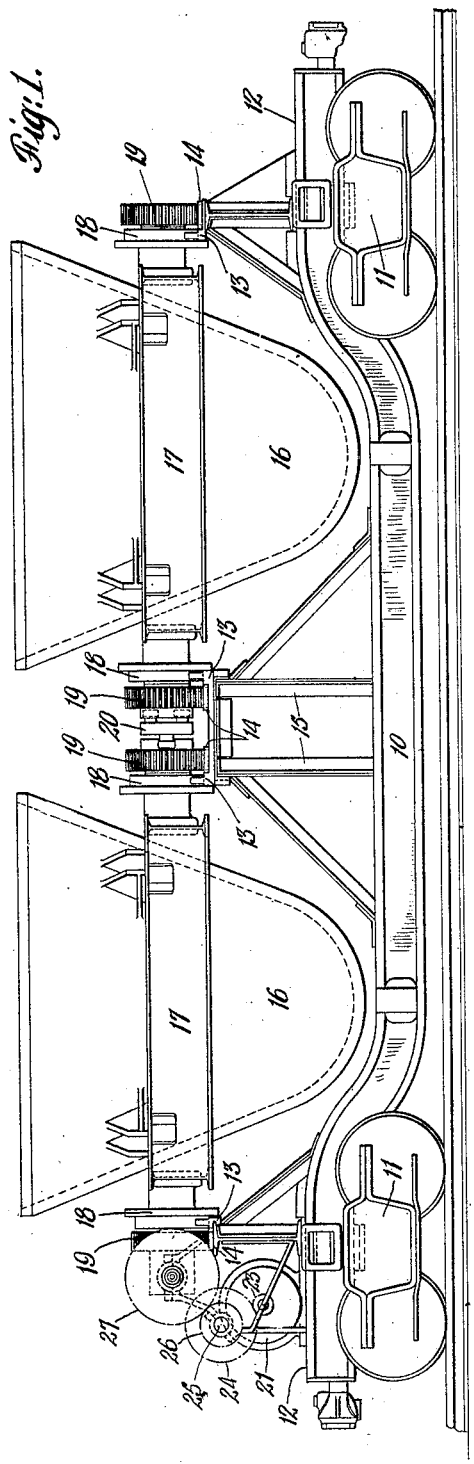
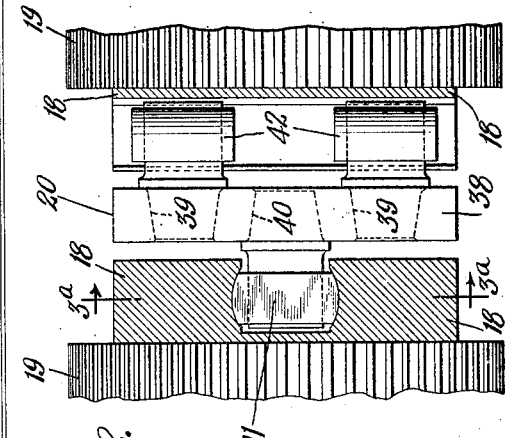
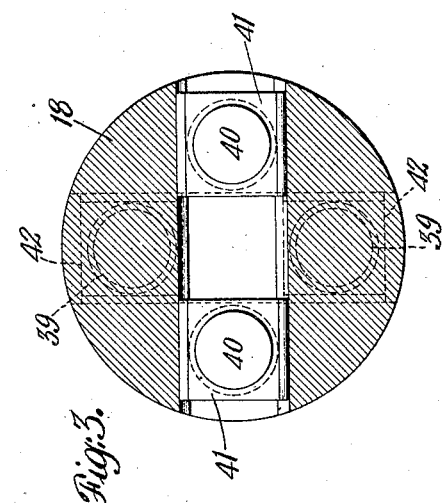
INVENTOR  
Carl P. Astrom  
BY  
ATTORNEY Jan. 4, 1927.　　　　C. P. ASTROM　　　　1,613,153
DUMPING CAR
Filed July 7, 1925　　　4 Sheets-Sheet 2

INVENTOR
Carl P. Astrom
BY
ATTORNEY

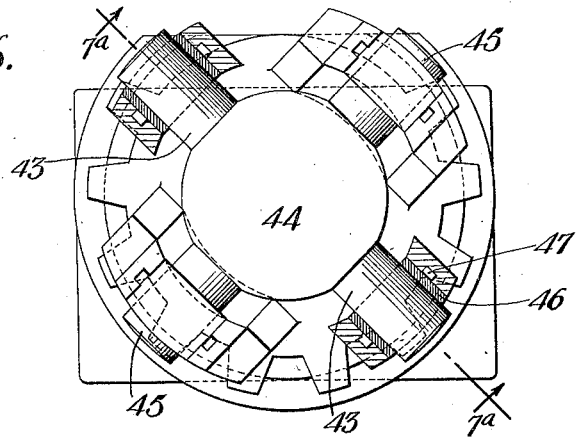
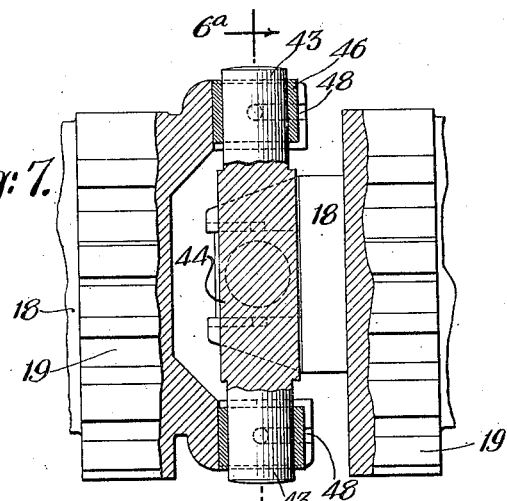
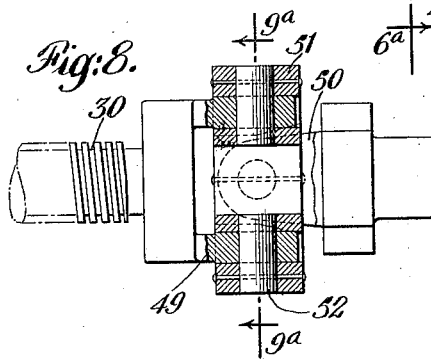
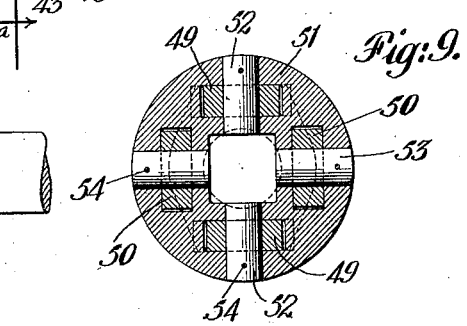

Jan. 4, 1927.

C. P. ASTROM 1,613,153

DUMPING CAR

Filed July 7, 1925

Inventor
Carl P. Astrom
By his Attorney

Patented Jan. 4, 1927.

1,613,153

UNITED STATES PATENT OFFICE.

CARL P. ASTROM, OF EAST ORANGE, NEW JERSEY, ASSIGNOR TO M. H. TREADWELL COMPANY, A CORPORATION OF NEW YORK.

DUMPING CAR.

Application filed July 7, 1925. Serial No. 41,918.

This invention relates to tilting and laterally moving dumping cars mounted on trunnions, and has for its object to provide a car having a plurality of dumping car bodies on the same underframe wherein the car bodies can be simultaneously operated by a motor and permitted to move relatively to each other. Such relative movement of the car bodies is of advantage in case of cinders or other obstacles on the racks or tracks, and also to facilitate spreading of the discharged slag, or to prevent backwash of molten slag on the tracks.

According to this invention, a plurality of separately supported dumping car bodies are mounted on a single underframe carrying a motor, a universal joint being provided between each car body and its actuating mechanism. The universal joints are especially constructed to withstand the heavy stresses to which such car body actuating mechanisms are subjected. By providing curved conical toothed racks and conical tracks, with co-operating conical toothed gears and trunnions, in combination with universal joints, the bodies can spread or converge in dumping and thus discharge the slag as may be desired.

In the accompanying drawings:

Fig. 1 is a side view of dump car bodies embodying the invention.

Fig. 2 is a detail of a universal joint between dumping car bodies.

Fig. 3 is a section on the line 3ª—3ª of Fig. 2.

Fig. 6 is a detail on the line 6ª—6ª of Fig. 7 showing the preferred form of universal joint to be used between the car bodies.

Fig. 7 is a section on the line 7ª—7ª of Fig. 6.

Fig. 8 is a view partly in section of the preferred form of universal joint to be used between the driving motor and its adjacent trunnion.

Fig. 9 is a section on the line 9ª—9ª of Fig. 8.

Figure 4:
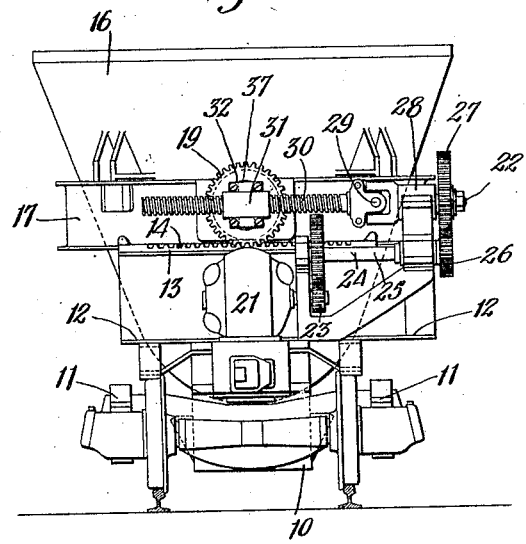
Fig. 4 is a left end view of the device shown in Fig. 1.
Figure 5:
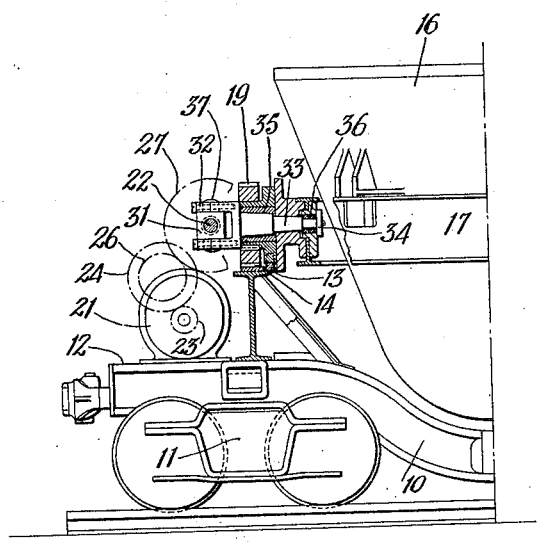
Fig. 5 is a detail of the trunnion driving pin.

Referring to the drawings, the numeral 10 indicates the underframe supported at each end on customary trucks 11 provided with usual coupling equipment and having top platforms 12 on which are mounted supports for the track rails 13 and the racks 14. The dumping car bodies 16 are provided with a support 15 in about the centre of the underframe whereby they are each separately supported in yokes 17 formed of rolled steel or other material and mounted on trunnions 18 adapted to roll along the track rails 13 in tilting. Pinions 19 mesh with the teeth of the racks 14 to prevent slipping of the trunnions on the rails. Intermediate the dumping car bodies the trunnions 18 are connected by a universal coupling 20 capable of tilting both car bodies in unison. At one end of the underframe mounted on platform 12 is the electric motor 21 driving the shaft 22 through the interposition of gears 23—24, shaft 25 and gears 26—27. The shaft 22 is provided with a stationary bearing 28 supported from the platform 12. Also on the shaft 22 is the universal coupling 29 actuating the threaded driving member 30 which parallels the track and is unsupported at its other end. The driving member 30 is provided with a low pitched screw so that the car will not actuate the motor. On the driving member 30 is a nut 31 secured within the bifurcated ends 32 of the pin 33 having two bearing surfaces 35 and 36 inside the trunnion and rotatably secured within the trunnion 18 by a bolted flange 34. Projections 37 on the nut retain the same within the bifurcated ends 32. At least one of the prongs of the bifurcated ends 32 is removably secured by bolts for the purpose of inserting the nut 31 in its projection. The stationary bearing 28 is adapted to take up thrusts axially of the threaded member 30 incident to tilting the dumping car body in either direction. As shown in Fig. 2 the universal coupling 20 comprises a central member 38 in which are secured a plurality of pins 39 and 40 projecting from each side and extending into the adjacent trunnions 18. The plane of the axes of the pins on one side is at right angles to the plane of the axes of the pins on the other side of the central member 38. The pins 40 are journalled within the trunnion by bearings 41 rounded so as to be capable of permitting limited rotation of each pin axis as illustrated. When in the position shown in Fig. 2 pins 40 can rotate slightly in the vertical plane and pins 39 in the horizontal. Also, each pin bearing is capable of sliding within its slot and each pin may slide in or out of its bearing. In case cinders collect on the rails remote from the universal joint between car bodies then the trunnion of one car body is caused to rotate horizontally slightly by lifting the trunnion enough to disengage the rack from the pinion, the trunnion axis of the other car body need not be angularly shifted because the universal coupling permits angular arrangement of one with respect to the other while still maintaining the driving connection. This is made possible by having the universal joint capable of permitting the pins on one side of the central member to be moved axially or moved slightly in and out of their bearing members. Flanges prevent any substantial shifting of the car body longitudinally of the trunnion axis as long as the same is on the rails.

Figures 6 and 7 show the preferred form of universal joint to be used between car bodies wherein pins 43 and 45 project from the connecting member 44, the axes of these pins being all in the same plane to prevent torsional strains on the joint. Bearings 46 surround each pin and are slidably inserted within the trunnions. The small projections 47 on the bearings 46 slide in grooves 48 in the trunnions and retain the bearings in position yet permit axial or longitudinal movement of the bearings in the trunnion extensions.

In Figures 8 and 9 is shown the preferred form of the universal joint for use between the driving motor and trunnion in place of the universal joint illustrated in Fig. 4, since that shown in Figs. 8 and 9 is of stronger construction. This joint comprises a pair of projection members 49 which engage the block 51. Corresponding projection members 50 also engage block 51 at 90° to the engagement of members 49. Pins 52 and 53 extending through the block 51 as illustrated retain the projection members 49 and 50 in position. In order to keep the parts in proper connection, the pins 52 and 53 are secured in position by smaller auxiliary pins 54. With the construction illustrated it will be seen that this coupling is enabled to withstand heavy strains by reason of the double shear applied to each of the pins 52 and 53 by the projection members 49 and 50.

Figure 10:
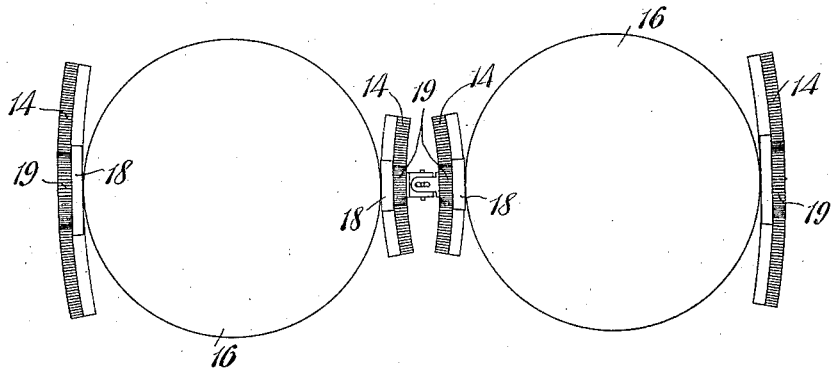
Fig. 10 is a plan view of a construction for moving the car bodies together in dumping.
Figure 11:
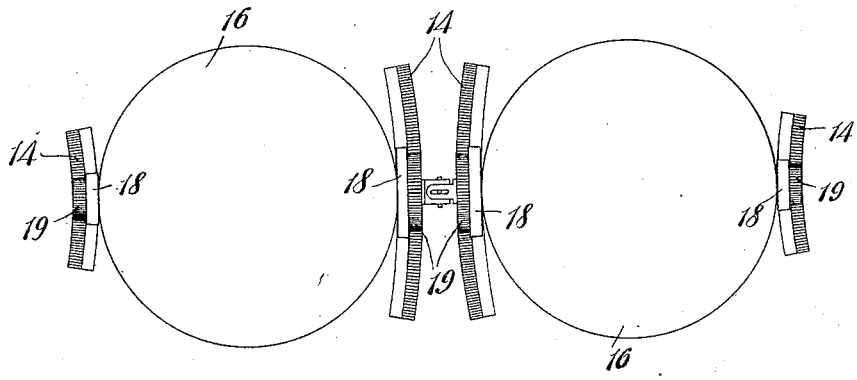
Fig. 11 is similar to Fig. 10 but showing an arrangement for increasing the separation of the car bodies in dumping.

In Fig. 10 the car bodies 16 roll on trunnions 18 in the usual manner and pinions 19 engage rack teeth 14. In order to bring the pouring spouts of the two car bodies closer together in dumping, the trunnions, tracks and racks are conical and curved slightly as illustrated in order that the outside trunnions of each car body may move slightly faster than the inner, the outside trunnions being slightly larger than the inner trunnions, but both are sections of the same cone in order to make the car bodies move together. With the track and rack teeth, also sections of a cone the car bodies can roll together without any difficulty with a universal joint between them. Fig. 11 is a view corresponding to Fig. 10 except that the trunnions are reversed and the inner trunnions are made larger for the purpose of separating the car bodies in dumping and further separating the pouring spouts than if the tracks were straight. Here also as illustrated the tracks, trunnions, and rack and gear teeth are sections of a cone.

Among the advantages of this invention may be mentioned safeguarding of the driving mechanism against dangerous strains when cinders or other material get in the rack teeth or on the track rails 13 causing one trunnion to be raised. The universal coupling 29 prevents transmission of any dangerous strains to the driving motor or its gears while the universal coupling 20 enables the connection between dumping car bodies to be yieldable while being sufficiently strongly designed to cause simultaneous tilting of both car bodies. Separately supporting the dumping car bodies lessens the strains imposed upon the trunnions of each and enables a plurality of car bodies to be mounted on the same underframe yet to be driven by a single motor. From the drawing it will appear that each car body has a flexible coupling between its trunnion and the driving mechanism therefor. The universal joint illustrated in Figs. 6 and 7 is stronger since the pins 43 and 45 have their axes in the same plane. The large number of shearing surfaces present in the universal joint illustrated in Figs. 8 and 9 makes this joint particularly adapted for a construction like the present invention where large stresses are met with. Having the conical racks curved slightly in combination with conical trunnions of unequal pitch diameters as illustrated in Figs. 10 and 11, it is possible to move the car bodies together in dumping so that the pouring spouts of the two may be closer together or if the construction of Fig. 11 is followed the pouring spouts may be separated in dumping. Having the car bodies moved together in dumping as in Fig. 10 enables the underframe 10 to be made shorter for the same size of car bodies since the car bodies are closer together and have increased truck clearance when moved outwardly over the side members of the underframe. If the construction of Fig. 11 be used slag is spread better and backwash over the track prevented. The rack and pinion teeth may not be conical but could be straight, provided there were sufficient looseness or clearance between the teeth.

As used in the claims, the term "universal joint" is used in a functional sense to cover a flexible coupling possessing the capabilities of a universal joint.

I claim:

1. The combination with a rigid underframe mounted on trucks, of a plurality of dumping car bodies carried thereon, a support for and between said dumping car bodies, and a universal coupling connecting said dumping car bodies.

2. The combination with a rigid underframe mounted on trucks and provided with transversely extending rails, of a plurality of separately supported normally alined dumping car bodies carried by said underframe and mounted on trunnions to roll on said rails, and means also carried by said underframe for tilting said dumping car bodies.

3. In tilting and laterally moving dumping cars, a plurality of car bodies mounted on trunnions on which they are adapted to roll in tilting, a motor and driving mechanism connected to one trunnion and driving said plurality of car bodies, said mechanism including flexible means permitting shifting of the axis of the trunnions relative to the motor axis without straining the driving mechanism or motor.

4. In tilting and laterally movable dumping cars, a plurality of separately supported car bodies mounted on trunnions for tilting, a motor, and driving mechanism connected to one trunnion and driving said plurality of car bodies, said mechanism including flexible means permitting shifting of the axis of the trunnions of any of said car bodies independently of the rest.

5. The combination with an underframe, of a plurality of separately supported dumping car bodies carried thereon, driving mechanism therefor, and a universal joint between each car body and its driving mechanism.

6. The combination with tilting and laterally movable dumping car bodies mounted on trunnions, of a supporting underframe for said trunnions and car bodies, a driving member extending laterally of said underframe and connected to a trunnion, a motor for actuating said driving member, and means connected to said driving member and located between said trunnion and motor for permitting independent rotation of the trunnion axes without interrupting or disconnecting said last mentioned means.

7. The combination with tilting and laterally movable dumping car bodies mounted on trunnions, of an underframe across which said car bodies are adapted to roll, a motor carried by said underframe, driving mechanism between said motor and a trunnion, and means permitting rotation of any or all of the trunnion axes without disconnecting or straining said driving mechanism.

8. The combination with a plurality of separately supported tilting and bodily movable dumping car bodies mounted on trunnions, of actuating means therefor, and a flexible coupling between adjacent car bodies comprising a connecting member, a plurality of pins projecting from said connecting member journalled within each trunnion, bearings for each pin slidably inserted in each trunnion, the bearings for one trunnion being shaped to allow movement between one trunnion and its pins at right angles to movement between the other trunnion and its pins.

9. The combination with a plurality of tilting and laterally movable dumping car bodies mounted on trunnions, of means for separately supporting the same, and a universal coupling between said car bodies constructed to allow limited axial shifting of one trunnion axis with respect to the other on the same support.

10. The combination with an underframe, of a pair of separately supported tilting and laterally movable dumping car bodies carried thereon, and means carried by the underframe for changing the spacing of said car bodies in dumping.

11. The combination with an underframe, of a plurality of tilting and laterally movable car bodies carried thereon, and means carried by the underframe for moving said car bodies closer together in dumping.

12. The combination with an underframe, of a plurality of tilting and laterally movable dumping car bodies carried thereon, tracks on said underframe and along which said car bodies roll, said tracks being shaped to change the space of said car bodies in dumping.

13. The combination with a rigid underframe, of a plurality of laterally movable dumping car bodies carried thereon, trunnions on which said car bodies roll, and a flexible coupling between said car bodies permitting the trunnion axis of one car body to be displaced from alignment with the trunnion axis of another car body carried by said underframe.

14. The combination with a plurality of separately supported tilting and bodily movable dumping car bodies mounted on trunnions, of actuating means therefor, and a flexible coupling between adjacent car bodies comprising a connecting member and a plurality of pins projecting from said connecting member in the same plane and journalled within each adjacent trunnion, bearings for which pins are slidably inserted in each trunnion; the bearing for each trunnion being shaped to allow axial movement between the trunnion and its pins.

15. The combination with an underframe, of a plurality of laterally movable dumping car bodies carried thereon, means for tilting said car bodies in dumping and means for changing the spacing of the car bodies during tilting.

16. The combination with an underframe, of a plurality of laterally moveable dumping car bodies carried thereon, trucks on which the car bodies are mounted, a universal joint between said car bodies and means for changing the spacing of said car bodies in dumping, said universal joint being constructed to be movable relatively to each car body.

17. The combination with an underframe mounted on trucks, of a plurality of laterally movable dumping car bodies carried on said underframe, means for tilting said car bodies and means to change the clearance between said car bodies and trucks in dumping.

18. The combination with an underframe mounted on trucks, of a plurality of laterally movable dumping car bodies carried on said underframe, means for tilting said car bodies, and means to increase the clearance between said car bodies and trucks in dumping.

19. The combination with a laterally movable dumping car body mounted on trunnions, of means for tilting the said car body, the trunnion at one end of said car body being larger than that at the other end thereof.

20. The combination with a tilting, laterally moving car body mounted on trunnions, of an underframe, a track on which said trunnions roll in dumping, and means for moving said car body on said track to shift the same laterally and longitudinally on said underframe and track.

Signed at New York in the county of New York and State of New York this 23rd day of June A. D. 1925.

CARL P. ASTROM.

DISCLAIMER 1,613,153.—*Carl P. Astrom*, East Orange, N. J. DUMPING CAR. Patent dated January 4, 1927. Disclaimer filed August 29, 1934, by the assignee, *M. H. Treadwell Company*, with the patentee assenting, ratifying and confirming.

Hereby disclaims from the scope of claim 2 of said Letters Patent any multiple body dumping car except wherein the car bodies are simultaneously tilted.

[*Official Gazette September 18, 1934.*]